June 3, 1941.   L. NAST   2,244,565
MULTICOLORED MOLDED PRODUCT AND METHOD OF MAKING THE SAME
Filed July 1, 1937   2 Sheets-Sheet 1
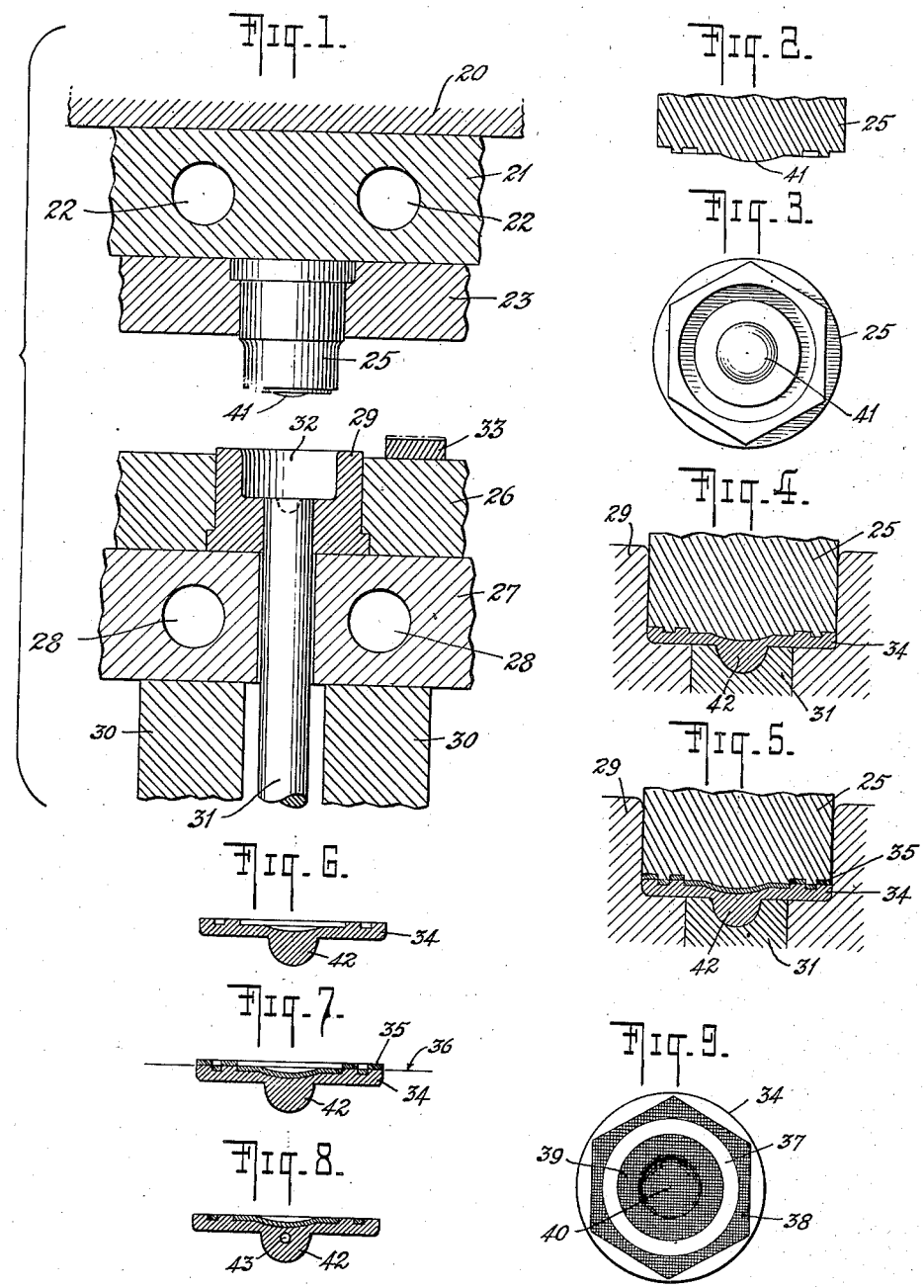
WITNESS
INVENTOR
LEO NAST
BY
ATTORNEYS June 3, 1941. L. NAST 2,244,565
MULTICOLORED MOLDED PRODUCT AND METHOD OF MAKING THE SAME
Filed July 1, 1937 2 Sheets-Sheet 2
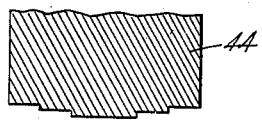
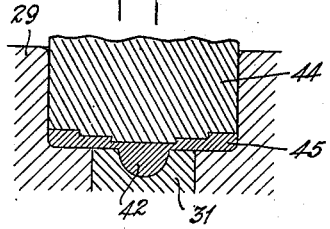
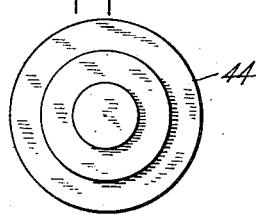
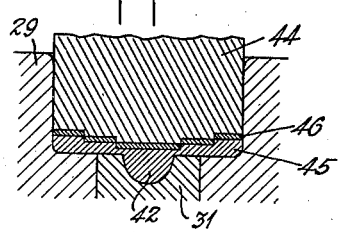
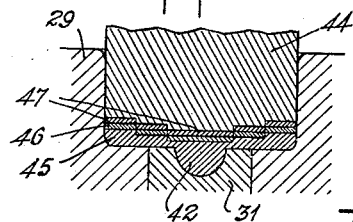
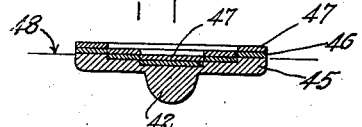
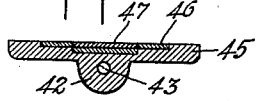
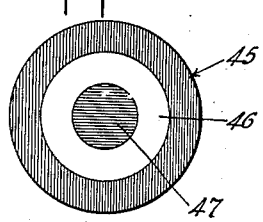
WITNESS
G. V. Rasmussen
INVENTOR
LEO NAST
BY
ATTORNEYS Patented June 3, 1941

2,244,565

UNITED STATES PATENT OFFICE 2,244,565

MULTICOLORED MOLDED PRODUCT AND METHOD OF MAKING THE SAME

Leo Nast, Plainfield, N. J., assignor to Universal Plastics Corporation, New Brunswick, N. J., a corporation of New Jersey Application July 1, 1937, Serial No. 151,427

5 Claims. (Cl. 18—61)

The invention relates to molded products such as buttons, bottle stoppers and similar articles having surface decoration in two or more colors, and to the process of making such products. More particularly, the invention relates to a method of producing such articles by a single stage thermosetting operation in which the plastic or composition material of which the article is fabricated is formed by molding so as to constitute the body of the article of one color, such material being cured or set by one impression of the mold elements so as to give the material sufficient hardness to withstand the pressure of a second molding operation without losing its original shape, in which second operation a layer of plastic or composition material of a second color is superimposed upon the body first formed. The material of the body and the superimposed layer are then brought by heat and pressure to a final stage by the same mold elements, in which stage the plastic or composition material is both insoluble and infusible.

In accordance with my invention, the article thus formed is then removed from the mold and subjected to an operation such as grinding, cutting or polishing, to remove a portion of the surface layer, thereby producing a surface upon the article having two colors.

In articles of the type to which the present invention relates, a surface decorated in two or more colors has heretofore been made only by a two stage thermosetting process in which the articles were made in two or more separate pieces, each piece with its individual coloring, the piece of one color being superimposed upon the other and joined together by an adhesive. The process of the present invention is distinguished from such prior art process in that the article is produced by a single thermosetting operation, the button, bottle stopper, or similar article being produced in a single mold in which a quantity of synthetic resin of one color is first partially cured, a second layer of synthetic resin of a different color being thereafter placed over the first layer, the heated mold members being brought together so as to cure or set completely the synthetic resin of both layers by heat and pressure. After such composite material has been set, the portion of the superimposed layer which extends above the plane constituting the upper surface of the first body of material may then be removed in any suitable manner so as to expose the resin with its different color constituting the body portion of the article, and impart, to the article, a duo-colored surface decoration.

My novel product may be formed of any suitable material, for instance, any of the well-known synthetic resins, including phenol formaldehyde resin, urea resin, or any other composition material. My invention is likewise applicable to the fabrication of molded products having any number of different colors constituting the surface decoration for the article and in any design or configuration of such surface decoration.

In the accompanying drawings, I have illustrated one particular form of mold structure capable of utilization in carrying out my invention. In such drawings also, I have illustrated two specific embodiments of my invention as applied to the fabrication of a button having a surface decoration of two contrasting colors and also a button having a surface decoration of three contrasting colors. It is to be understood, of course, that my invention is not limited to the specific embodiments illustrated and described and that I have shown specific illustrations of decorative surfaces, such showing being by way of illustration rather than by way of limitation.

In such drawings, Fig. 1 illustrates, in cross-section, the upper and lower platens and mold elements of a press adapted for utilization in the fabrication of a molded article in accordance with my invention; Fig. 2 shows, in section, the upper die of the press for the particular design of article illustrated; Fig. 3 is a plan view, looking upward, of the upper die; Fig. 4 shows in section the position of the die in making the first impression with the synthetic resin of the basic color; Fig. 5 is a similar view showing the second impression with the synthetic resin of a second and contrasting color being molded on top of the resin of basic color; Fig. 6 is a section through the button after the step of molding the resin of the first or basic color; Fig. 7 is a section through the button with the resin of the second color molded thereon; Fig. 8 is a section through the button after the removal of part of the resin of second color along the line shown in Fig. 7; Fig. 9 is a plan view of the finished button showing the duo-colored surface decoration thereof; Fig. 10 is a section through the upper die used to obtain a three color effect or surface decoration in a circular pattern; Fig. 11 is a plan view of the upper die of Fig. 10; Fig. 12 shows the position of the mold elements after the first impression of resin of one color; Fig. 13 shows the mold elements after the second impression, i. e., after resin of the second color has been molded on the top of the first or basic color; Fig. 14 shows the mold elements after the third impression; Fig. 15 shows a section through the button with the resin of the third color molded thereon; Fig. 16 is a section through the button after removal of part of the second and third colored resins along the line indicated in Fig. 15; and Fig. 17 is a plan view of the finished button having a surface decoration in three contrasting colors, in a circular pattern.

Referring more particularly to the drawings, in which similar reference characters identify similar parts in the several views, 20 is the upper platen of a press having a steam plate 21, provided with channels 22 for heating the mold. 23 is a retainer plate for the upper mold while 25 designates generally the upper die member. The lower retaining plate is supported upon steam plate 27, provided with steam channels 28, the lower die being designated as 29. Spacers 30, 30 support the steam plate 27 on the lower platen of the press (not shown). A shaft 31, constituting an ejector for removing the finished article from the cavity 32 of the lower die 29, passes through the lower steam plate 27 and through the lower die 29.

A block 33 is positioned upon the upper surface of the lower platen 26 to regulate the stroke of the upper die. Such a stop block is replaceable by another block of greater thickness, as shown by the dotted line, to permit two different strokes of the upper die, or the same block, permitting two different strokes, may be used.

It should be understood that the press illustrated in Fig. 1 indicates only generally one suitable type of such apparatus that may be used for carrying out my invention. Such press is substantially like that used in any ordinary molding process, the only item distinguishing the arrangement from those customarily used in normal molding operations being the stop block 33 interposed between the upper and lower retainer plates to permit two different strokes of the molding die. Thus, it will be recognized by those skilled in the art that the steam platens shown in Fig. 1 are merely illustrative of one particular way in which the molds may be heated, it being obvious that any other conventional means of heating the molds, such as by gas or electricity, may be used. Furthermore, the mechanism for operating the press elements and the ejector 31 are not shown as any conventional apparatus may be used for that purpose.

In carrying out the method of my invention, the cavity 32 of the lower die 39, with the press elements in open position as shown in Fig. 1, is filled with a synthetic resin or composition material of the color to constitute the basic color of the button to be produced. The upper platen of the press carrying the upper die is lowered to a position determined by the height of the first (thinner) stop block 33, the difference between the heights of the two blocks being determinative of the thickness of the second layer of resin, and the resin is subjected to a thermo setting operation (steam, of course, being circulated through the channels 22 and 28) so as to have the resin cured during such first impression just long enough to give the material sufficient hardness to shape it. This curing operation must not be carried to such an extent as to have the resin firmly set to its final insoluble and infusible stage. When the material has sufficiently hardened (partially cured), the upper platen is raised. The article being molded would then have the shape and form 34 shown in Fig. 6.

After opening of the press, a layer of synthetic resin of a contrasting color to that of the color of the basic layer is placed over the surface of the incomplete article 34. The upper platen is then again lowered and the thermo setting of the superimposed layer and that of the basic layer are completed. The curing time and temperature for the first impression must be carefully controlled so as to give the material being cured sufficient hardness to withstand the pressure of the second molding operation without such basic layer losing its original shape. The curing time and temperature for the second impression should be long enough to cure fully the first colored resin as well as the second or superimposed layer of resin, thereby bringing the composite, unitary structure to its final stage.

Upon completion of the second impression, the article will be in the form and have the shape shown in Fig. 7 in which 34 is the basic layer and 35 is the superimposed thin layer of resin, the thin layer of resin throughout certain portions of the upper surface of the article filling the cavities formed in the body of the article by the first impression.

In effecting the final curing of the two layers of synthetic resin, to produce the semi-finished product shown in Fig. 7, the synthetic resin of both layers has been brought by heat and pressure to the final "C" stage in which the resin is both insoluble and infusible.

The article of Fig. 7 is removed from the mold cavity 32 and is then subjected to a grinding operation, or to any other cutting or polishing operation, to remove the portions of the layer of resin of the second color above the line 36 shown in Fig. 7. By such grinding, polishing, or cutting operation, the excess portions of the superimposed layer are removed so as to uncover those portions of the body of the article having the basic color desired which constituted the upper surface of the partially finished and partially cured body 34 of Fig. 6.

The finished article, in the instance illustrated a button, is shown in plan view in Fig. 9. In such button, a hexagonal and annular pattern, to constitute the surface decoration of the button, is illustrated, which hexagonal pattern is obtained by the specific upper die shown in Figs. 2 and 3. In the button illustrated in plan view Fig. 9, the body of the button, which constitutes the first layer 34, is shown white, near the border of the article, with a concentric ring 37 of the same color, and a hexagonal pattern 38 of black intermediate the concentric ring 37 and the outer periphery of the upper surface of the button. The central portion 39 of the button is likewise black, as is the central depression 40 formed by the depression 41 in the center of the upper die. The button is provided with the usual projection 42 having an aperture 43, drilled thereinto for attachment thereof to a fabric.

It should be understood that the stroke of the upper die 25 and therefore the thickness of the layer of resin 34 is controlled by means of the spacing block 33 and that the thickness of the superimposed layer 35 formed during the second impression, is likewise controlled by the thickness of the same spacer block having two steps or by the use, successively, of two blocks of different heights.

In the embodiment of my invention illustrated in Figs. 10 to 17, inclusive, I have shown a type of die for use in producing an article, such as a button, having a surface decoration in three contrasting colors. Thus, it is only necessary to have the lower face of the die conform to the particular pattern to be imparted to the article, three steps in the die being necessary for forming a surface decoration of three contrasting colors.

In carrying out my invention to produce the three-color article, the same general arrangement of molds and dies is used as illustrated in Fig. 1, the only difference being that for a three-tone process steps for three different strokes of the upper die 44 must be provided.

The button, the steps in the fabrication of which are illustrated in Figs. 10-17, is one having a three-color effect in a circular pattern. In such steps, the first impression produces the unfinished portion 45 of the button, such unfinished portion being incompletely cured as hereinabove explained with respect to the duo-colored process. Upon this unfinished basic layer is superimposed a layer 46 of resin of a second color, which likewise is not cured completely during the second impression. Superimposed upon the second layer is a third layer 47 of still a different color, the three layers together, upon the third impression, being brought to the final "C" or insoluble and infusible stage by the thermo setting operation.

After the unfinished article illustrated in Fig. 15 has been removed from the cavity of the lower die by the ejector, it is subject to a grinding, polishing, or cutting operation whereby the portions of the two upper layers above the line 48 of Fig. 15 are removed so as to expose the three different layers in concentric circles having contrasting colors as illustrated in Fig. 17.

As pointed out hereinabove, the controlling factor in producing an article of satisfactory composition, appearance and adhesion between the two or more layers of resin, the curing time for the first and intermediate impression should be just long enough to give the material sufficient hardness to withstand the pressure of the subsequent molding operation without losing shape and to prevent the possibility that no bond between the several layers is obtained. The curing time for the last impression should always be long enough to cure fully the first and intermediate layers as well as the final layer.

No particular method of partially removing the superimposed layers is absolutely necessary in carrying out my process. In several different types of articles, different methods of removing the excess material may be advantageously used.

It is obvious that the two particular embodiments of articles selected for illustration of my novel process merely indicate the general nature of a large variety of articles that may be produced in accordance with my process and to this extent the accompanying drawings and description are to be regarded merely as illustrative of a particular embodiment of my invention.

I claim:

1. The method of fabricating, in a single mold, an article of thermo-setting composition material having a surface decoration in two or more contrasting colors, which comprises molding a quantity of such material of one color into a form having a surface, portions of which are depressed from the top plane thereof, by a thermo setting operation, partially curing such material, superimposing upon such partially cured material at least one layer of uncured, like composition material of a second color, completing the curing of said first layer and completely curing said second layer by heat and pressure, and removing portions of the superimposed layer to expose portions of the base layer, thereby imparting to the finished article a surface decoration in a plurality of contrasting colors.

2. The method of fabricating, in a single mold, an article of thermo-setting synthetic resin material having a surface decoration in two contrasting colors, which comprises molding a quantity of such material of one color into a form having an irregular surface, by a thermo setting operation, partially curing such material, superimposing upon such partially cured material a layer of uncured, like synthetic resin material of a second color, completing the curing of said first layer and completely curing said second layer by heat and pressure, and removing portions of the superimposed layer to expose portions of the base layer, thereby imparting to the finished article a surface decoration in two contrasting colors.

3. The method of fabricating, in a single mold, an article of thermo-setting composition material having a surface decoration in a plurality of contrasting colors, which comprises molding a quantity of such material of one color into a form having an irregular surface, by a thermo setting operation, partially curing such material, superimposing upon such partially cured material another layer of uncured, like composition material of a second color, partially curing said second layer, superimposing a third layer of uncured, like composition material upon said second layer, completely curing all of said layers to bring them into the final, insoluble and infusible stage, by heat and pressure, and removing portions of the superimposed layers to expose portions of the base layer and of the intermediate layer, thereby imparting to the finished article a surface decoration in three contrasting colors.

4. As an article of manufacture, a molded product comprising a base layer of thermo-setting material of one color having depressions in the surface thereof, and a layer of like composition material, of a contracting color, superimposed upon the surface of the base layer and filling the depressions in such surface, said base layer and superimposed layer constituting together a non-laminated molded product, the juncture between the constituent layers of which is characterized by a flowed-in cohesion of the layers firmly molding them together in insoluble and infusible condition, the flowed-in cohering portion possessing the characteristics of one which is produced by effecting first the partial curing of the base layer, and then the final curing of said base layer simultaneously with the complete curing of the superimposed layer, the product having a surface decoration in a plurality of contrasting colors, and the superimposed layer having throughout its depth the exact outline of the desired design.

5. As an article of manufacture, a molded product comprising a base layer of thermo-setting material of one color having depressions in the surface thereof, an intermediate layer of like composition material superimposed upon and filling the depressions in the surface of the base layer, said intermediate layer having depressions therein, and a third layer of like composition material of a color contrasting with those of the base and intermediate layers, said third layer being superimposed upon said intermediate layer and filling the depressions in the surface thereof, said base layer, intermediate layer and third layer constituting together a non-laminated molded product, the juncture between the various constituent layers of which is characterized by a flowed-in cohesion of the layers firmly molding them together in insoluble and infusible condition, the flowed-in cohering portion possessing the characteristics of one which is produced by effecting first the partial curing of the base layer, then the partial curing of the intermediate layer, and the final curing of said layers simultaneously with the complete curing of the third layer, the superimposed layers of material having throughout their depth the exact outline of the desired design.

LEO NAST.

CERTIFICATE OF CORRECTION.

Patent No. 2,244,565.  June 3, 1941.

LEO NAST.

It is hereby certified that error appears in the printed specification of the above numbered patent requiring correction as follows: Page 3, second column, line 48, claim 4, for the word "contracting" read --contrasting--; same page and column, line 52, and page 4, first column, line 5, claims 4 and 5 respectively, strike out "non-laminated"; page 3, second column, line 55, and page 4, first column, line 8, claims 4 and 5 respectively, for the word "molding" read --holding--; and that the said Letters Patent should be read with this correction therein that the same may conform to the record of the case in the Patent Office.

Signed and sealed this 8th day of July, A. D. 1941.

(Seal)

Henry Van Arsdale,
Acting Commissioner of Patents.